United States Patent [19]

Inoue

[11] Patent Number: 4,459,453

[45] Date of Patent: Jul. 10, 1984

[54] METHOD OF ELECTRICAL-DISCHARGE-MACHINING A CONDUCTIVE WORKPIECE WITH A CARBONACEOUS ELECTRODE

[75] Inventor: Kiyoshi Inoue, Tokyo, Japan

[73] Assignee: Inoue-Japax Research Incorporated, Yokohama, Japan

[21] Appl. No.: 287,045

[22] Filed: Jul. 27, 1981

[30] Foreign Application Priority Data

Jul. 29, 1980 [JP] Japan .................................. 55-103873

[51] Int. Cl.³ ............................ B23P 1/08; H01J 9/00
[52] U.S. Cl. ................................ 219/69 M; 219/69 E; 219/146.22; 252/502
[58] Field of Search ...................... 219/69 E, 69 R, 68, 219/117, 146.21, 146.1, 142.22; 252/502; 29/25.17

[56] References Cited

U.S. PATENT DOCUMENTS 3,911,246 10/1975 Drinkard, Jr. ...................... 219/69 E

FOREIGN PATENT DOCUMENTS 1139914 1/1969 United Kingdom ............. 219/69 E
1347391 2/1974 United Kingdom ............. 219/69 E
1408801 10/1975 United Kingdom ............. 219/69 E Primary Examiner—M. H. Paschall
Attorney, Agent, or Firm—Karl F. Ross; Herbert Dubno

[57] ABSTRACT

An EDM method utilizing an improved tool electrode made of a sintered carbonaceous body consisting essentially of 50 to 90% graphitized carbon and the balance nongraphitized carbon uniformly distributed therein. The body may be prepared by sintering a mass of graphitized carbon particles and nongraphitized carbon particles mixed uniformly together in an optimum proportion under pressure. During sintering, the mass may be compressed bi-axially but is preferably tri-axially or isostatically compressed. The carbonaceous body of the invention may be prepared by sintering together graphitized carbon particles and a predecessor of the nongraphitized carbon, by sintering a uniform mixture of a predecessor of graphitized carbon and a predecessor of nongraphitized carbon. The predecessor of nongraphitized carbon is advantageously constituted by phenol and/or furan.

10 Claims, 2 Drawing Figures

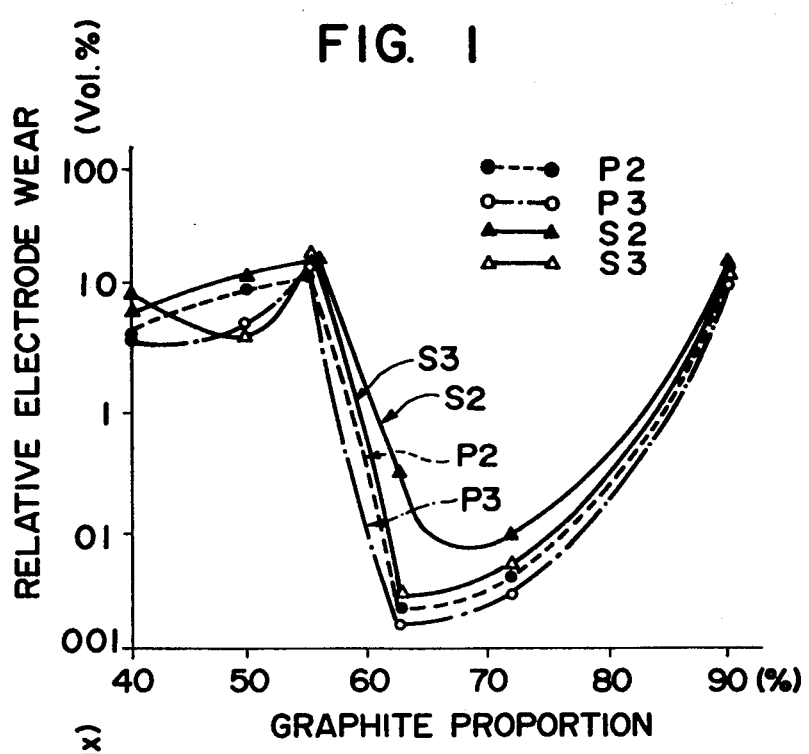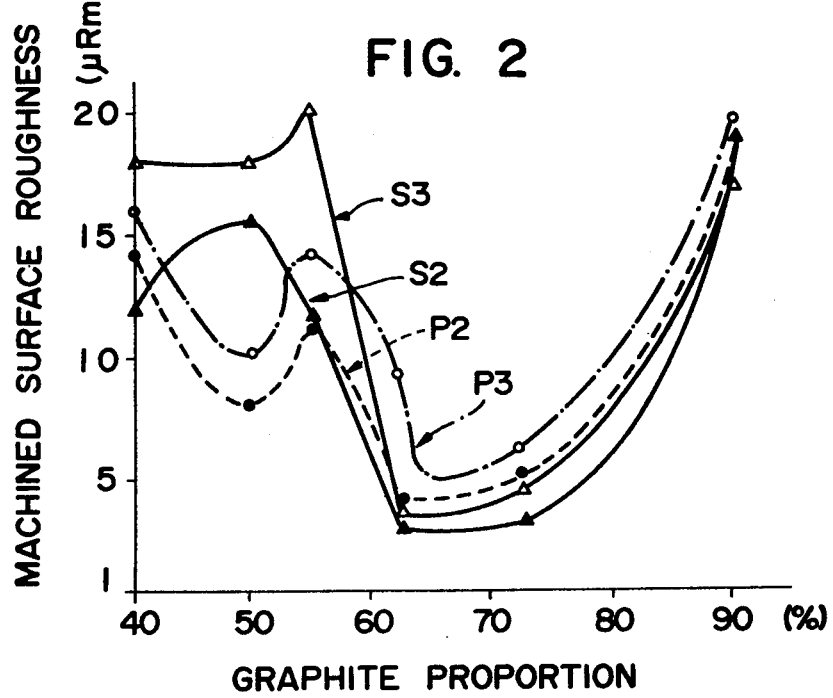

METHOD OF ELECTRICAL-DISCHARGE-MACHINING A CONDUCTIVE WORKPIECE WITH A CARBONACEOUS ELECTRODE

FIELD OF THE INVENTION

The present invention relates to an improved electrical discharge machining (EDM) method using a tool electrode a novel carbonaceous tool electrode.

BACKGROUND OF THE INVENTION

In electrical-discharge-machining processes, a tool electrode is spacedly juxtaposed with a conductive workpiece across a machining gap filled with a liquid dielectric and a succession of electrical pulses are passed between the tool electrode and the workpiece to effect time-spaced electrical discharges across the machining gap, thereby electroerosively removing material from the workpiece while the tool electrode and the workpiece are relatively displaced to machine the workpiece with a desired shape. In such processes a carbonaceous body may constitute the tool electrode but a conventional carbonaceous EDM electrode has been made basically from either nongraphitized or graphitized carbon. It has been recognized that these tool electrodes suffer a considerable wear during an EDM operation and produce a relatively rough EDM machined surface on the workpiece.

OBJECTS OF THE INVENTION

It is an important object of the present invention to provide an improved method of electrical-discharge-machining an electrically conductive workpiece with a carbonaceous tool electrode, whereby the tool wear or the EDM surface roughness and especially both are minimized.

SUMMARY OF THE INVENTION

The foregoing object is attained, in accordance with the present invention, by providing a tool electrode for EDM, made of a sintered carbonaceous body consisting of 50 to 90% by weight or volume graphitized carbon and the balance nongraphitized carbon uniformly distributed in the graphitized carbon. The proportion of graphitized carbon should range preferably between 55 and 85% and still more preferably between 60 and 80%.

The invention provides a method of machining a conductive workpiece, which comprises: preparing a tool electrode made of a sintered carbonaceous body consisting of 50 to 90%, preferably 55 to 85% and still more preferably 60 to 80%, by weight graphitized carbon and the balance non-graphitized carbon uniformly distributed in the graphitized carbon; juxtaposing the tool electrode with the workpiece across a machining gap filled with a dielectric liquid; passing a succession of electrical pulses between the tool electrode and the workpiece to produce time-spaced electrical discharges across the machining gap, thereby electroerosively removing material from the workpiece; and relatively displacing the tool electrode and the workpiece to machine the latter with a desired shape.

The carbonaceous body may be prepared by sintering or heating under pressure, a mass of 50 to 90%, preferably 55 to 85% and still more preferably 60 to 80%, of graphitized carbon particles and the balance of nongraphitized carbon particles uniformly distributed therein. During sintering, the mass may be compressed bi-axially i.e. from two opposed directions (bi-axial compaction) but should preferably be compressed tri-axially i.e. from three independent directions (tri-axial compaction) or even compressed isostatically (isostatic compaction).

Alternatively, the carbonaceous body may be prepared by heating a uniform mixture of a predecessor (precursor) of the graphitized carbon and a predecessor of the nongraphitized carbon or a uniform mixture of graphitized carbon particles and a predecessor of the nongraphitized carbon. The predecessor of nongraphitized carbon is advantageously constituted by phenol and/or furan.

BRIEF DESCRIPTION OF THE DRAWING

In the accompanying drawing

FIG. 1 is a graph showing the relationship between the EDM relative electrode wear plotted along the ordinate and the graphite proportion plotted along the abscissa; and FIG. 2 is a graph showing the relationship between the EDM surface roughness plotted along the ordinate and the graphite proportion plotted along the abscissa.

SPECIFIC DESCRIPTION

The advantages of the present invention will become readily apparent by referring to specific examples set forth hereinafter.

Sintered carbonaceous bodies are prepared which contain varying proportions of graphitized carbon and nongraphitized carbon indicated in Table 1 below.

TABLE 1

| Sample No. | Nongraphitized Carbon (%) | Graphitized Carbon (%) |
| --- | --- | --- |
| 1-1 | 37 | 63 |
| 1-2 | 37 | 63 |
| 2-1 | 28 | 72 |
| 2-2 | 28 | 72 |
| 3-1 | 10 | 90 |
| 3-2 | 10 | 90 |
| 4-1 | 45 | 55 |
| 4-2 | 45 | 55 |
| 5-1 | 50 | 50 |
| 5-2 | 50 | 50 |
| 6-1 | 60 | 40 |
| 6-2 | 60 | 40 |

Each sample above is prepared by sintering or heating under pressure a mass of graphitized carbon powder particles and nongraphitized carbon powder particles uniformly mixed together in a mixing proportion as indicated. Sample Nos. 1-1, 2-1, 3-1, 4-1, 5-1 and 6-1 are bodies sintered under bi-axial compaction or compressed bi-axially or from two opposed directions (e.g. +Z, −Z). Samples Nos. 1-2, 2-2, 3-2, 4-2, 5-2 and 6-2 are bodies sintered under tri-axial compaction i.e. compressed tri-axially or from three independent directions which are orthogonal to one another (e.g. X, +Z, −Z). From these samples, Nos. 1-1, . . . 6-2, tool electrodes are prepared, 1-1P, 1-1S, 1-2P, 1-2S, 2-1P, 2-1S, 2-2P, 2-2S, 3-1P, . . . , 6-1P, 6-1S, 6-2P and 6-2S. Each of the tool electrodes in one class, 1-1P, 1-2P, . . . , 6-1P and 6-2P, has its machining surface—for juxtaposition with a workpiece—constituted by such a surface of the body as directly compressed i.e. as extending perpendicular to the direction in which it was compressed during sintering. Each of tool electrodes in the other class, 1-1S, 1-2S, . . . , 6-1S and 6-2S has its machining surface constituted by such a surface of the body as not directly compressed i.e. as extending in parallel with the direction in which it was compressed during sintering or extending perpendicular to a surface of direct compression.

With each of these tool electrodes, a tool-steel workpiece is machined by an EDM process using kerosene as the liquid machining medium and a succession of electrical pulses having a peak current Ip of 4.5 amperes, a pulse duration $\tau$on of 160 microseconds and a pulse interval $\tau$off of 10 microseconds, which permits a workpiece removal rate of 0.008 to 0.024 gram/min. Relative electrode wear (volume of electrode wear divided by workpiece volume stock removal) and machined surface roughness as measured are shown in Table 2 below.

TABLE 2

| Electrode Sample No. | Relative Electrode Wear (%) | | Surface Roughness ($\mu$Rmax) | |
|---|---|---|---|---|
| | P | S | P | S |
| 1-1 (biaxial) | 0.04 | 0.4 | 4 | 8 |
| 1-2 (triaxial) | 0.03 | 0.04 | 3 | 4 |
| 2-1 (biaxial) | 0.06 | 0.09 | 5 | 6 |
| 2-2 (triaxial) | 0.05 | 0.08 | 4 | 4.5 |
| 3-1 (biaxial) | 16 | 11 | 18 | 22 |
| 3-2 (triaxial) | 10 | 14 | 16 | 17 |
| 4-1 (biaxial) | 18 | 16 | 11 | 12 |
| 4-2 (triaxial) | 12 | 13 | 14 | 20 |
| 5-1 (biaxial) | 11 | 14 | 8 | 10 |
| 5-2 (triaxial) | 7 | 6 | 16 | 18 |
| 6-1 (biaxial) | 7 | 9 | 14 | 17 |
| 6-2 (triaxial) | 6 | 8 | 12 | 18 |

In the graphs of FIGS. 1 and 2, the relationship between the proportion of graphite in the graphite/cabon EDM electrode and the EDM relative electrode wear and the relationship between the graphite proportion and the EDM surface roughness are shown. In the graphs, each curve denoted by P2 is for a tool electrode whose machining surface is constituted by one surface of direct compression of the two-axis compression during sintering and each curve denoted by P3 is for a tool electrode whose machining surface is constituted by one surface of direct compression of the three-axis compression during sintering. Each curve denoted by S2 is for a tool electrode whose machining surface extends perpendicular to that surface of direct compression of the two-axis compression and each curve denoted by S3 is for a tool electrode whose machining surface extends perpendicular to that surface of direct compression of the three-axis compression.

From the graphs of FIGS. 1 and 2, it can be seen that a critical range of the proportion of graphite exists between 50 and 90% for both relative electrode wear and surface roughness. Thus, both of relative electrode wear and surface roughness are sharply reduced and minimized in this range of graphite proportion. It can be seen that the graphite proportion should range preferably between 55 and 85% and still more preferably between 50 and 80%. It is further seen that a body sintered under three-axis compression provides a better (less) electrode wear and less directional change in both electrode wear and surface roughness than that sintered under two-axis compression.

The novel carbonaceous body for EDM tool electrode of the invention may also be prepared by sintering a uniform mixture of graphitized carbon particles and a predecessor of nongraphitized carbon in a liquid or solid form. The body may also be prepared sintering a uniform mixture of a predecessor or precursor of graphitized carbon and a predecessor of nongraphitized carbon. The predecessor of nongraphitized carbon is advantageously constituted by phenol, furan or of glassy carbon whereas the predecessor graphitized carbon of other origin may be a coke and/or a petroleum pitch as is well known in the carbon material art.

What is claimed is:

1. A method of electrical-discharge-machining a conductive workpiece, comprising the steps of:
   (a) preparing a tool electrode by heating at such a temperature and simultaneously externally compressing multi-axially under such a pressure, a mass of uniform mixture of such different carbonaceous materials of first and second classes as to form a sintered carbonaceous body consisting of 50 to 90% by weight graphitized carbon and the balance nongraphitized carbon uniformly distributed therein;
   (b) juxtaposing with said workpiece a machining surface of said tool electrode which surface is constituted by a surface of said body extending substantially perpendicular to a direction in which said pressure was externally applied in step (a); and
   (c) passing a succession of electrical pulses between said surface of the tool electrode and said workpiece in the presence of a liquid machining medium supplied into a machining gap formed therebetween to produce time-spaced electrical discharges across said machining gap, thereby removing material from said workpiece while relatively displacing said tool electrode and said workpiece to machine the latter with a desired shape.

2. The method defined in claim 1 wherein said carbonaceous material of first class is constituted by 50 to 90 parts by weight of graphitized carbon particles and said carbonaceous material of second class is constituted essentially by 10 to 50 parts by weight of nongraphitized carbon particles.

3. The method defined in claim 1 wherein said carbonaceous materials of first and second classes are constituted by graphitized carbon particles and a predecessor of said nongraphitized carbon, respectively.

4. The method defined in claim 1 wherein said carbonaceous materials of first and second classes are constituted by a predecessor of graphitized carbon and nongraphitized carbon particles, respectively.

5. The method defined in claim 1 wherein said carbonaceous materials of first and second classes are constituted by a predecessor of said graphitized carbon and a predecessor of said nongraphitized carbon, respectively.

6. The method defined in claim 3 or claim 5 wherein said predecessor of the nongraphitized carbon is at least one substance selected from the group consisting of phenol and furan.

7. The method defined in claim 4 or claim 5 wherein said predecessor of the graphitized carbon is at least one substance selected from the group which consists of a coke and a petroleum pitch.

8. The method defined in claim 1 wherein in step (a) said mass is compressed bi-axially under said pressure.

9. The method defined in claim 1 wherein in step (a) said mass is compressed isostatically under said pressure.

10. The method defined in claim 1 wherein in step (a) said mass is compressed tri-axially under said pressure.

* * * * *